June 13, 1933.  C. B. QUAKA  1,913,898
LUBRICATING SYSTEM
Filed June 16, 1931   2 Sheets-Sheet 1
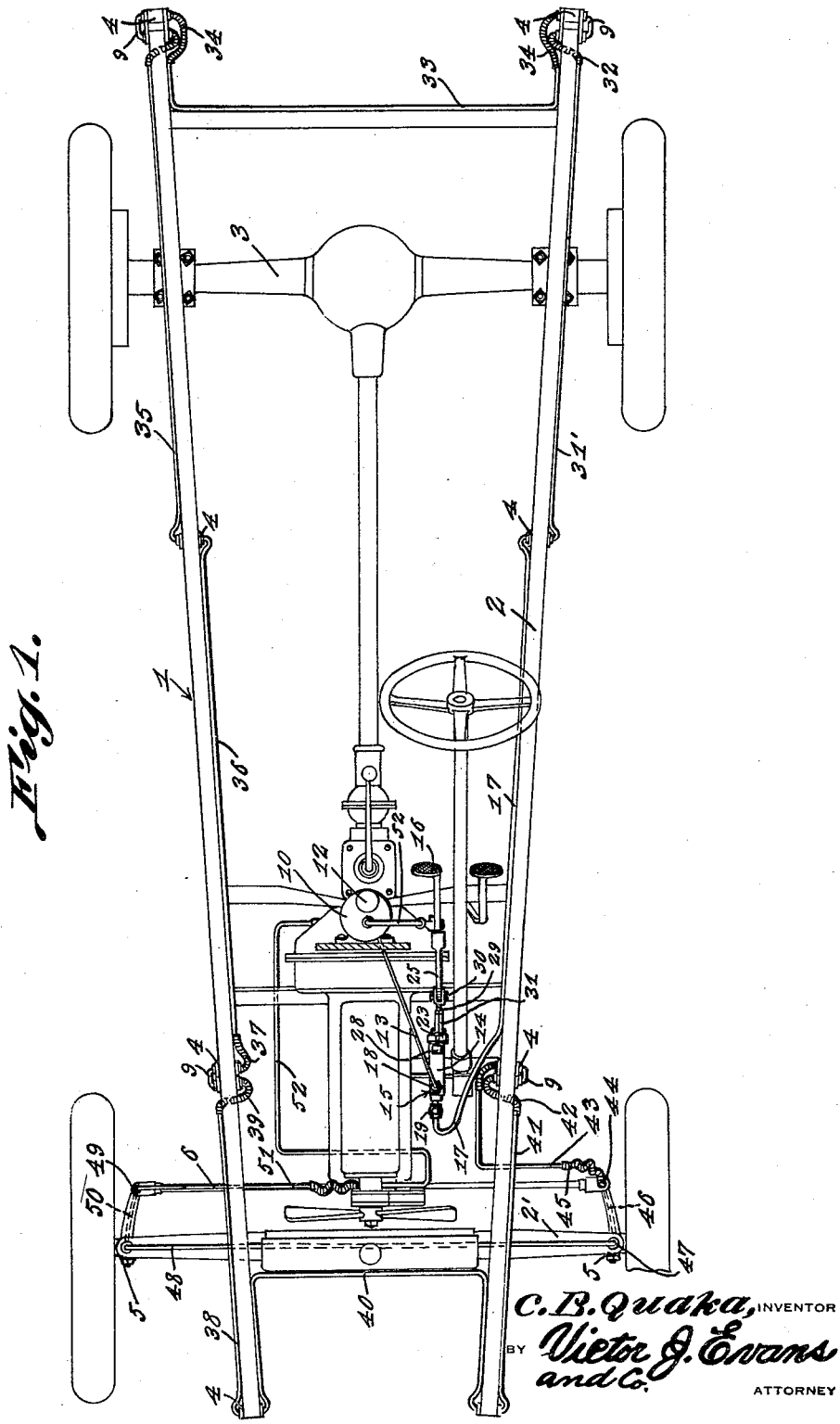

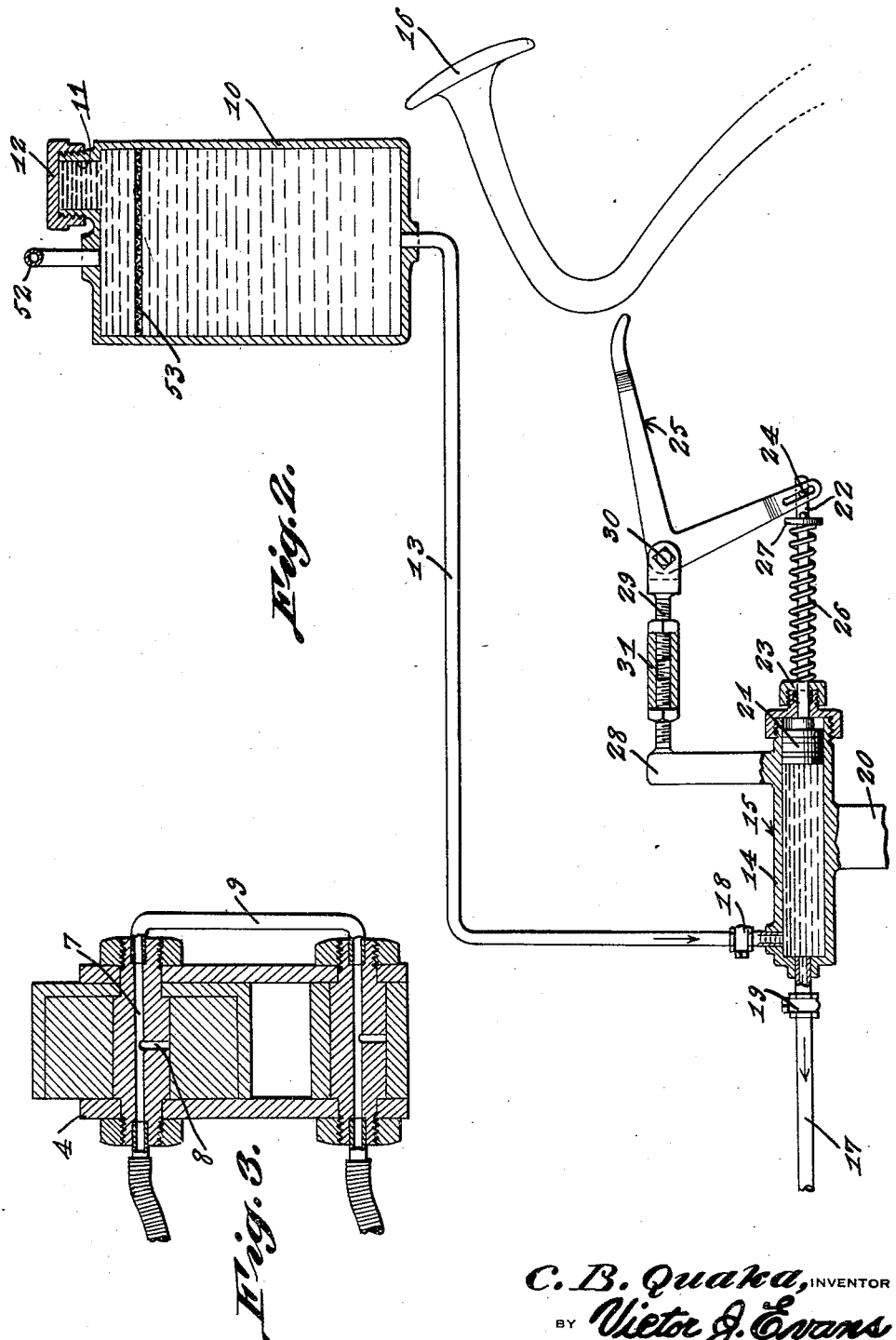

Patented June 13, 1933

1,913,898

UNITED STATES PATENT OFFICE

CYRIL B. QUAKA, OF BRIDGEPORT, CONNECTICUT, ASSIGNOR OF ONE-HALF TO JOSEPH TEDESCO, OF BRIDGEPORT, CONNECTICUT

LUBRICATING SYSTEM

Application filed June 16, 1931. Serial No. 544,895.

This invention relates to lubricating systems for motor vehicles and more particularly for lubricating moving parts of the chassis of the vehicle and has for the primary object, the provision of means whereby the moving parts may be continuously fed with lubricant and the surplus lubricant returned to the main supply for use over again, thus assuring efficient lubrication without undue waste of the lubricant and the lack of lubrication to certain parts where other parts receive excessive lubrication as frequently happens in lubricating systems now in use.

Another object of this invention is the provision of means for conducting lubricant under pressure from one moving part to another moving part of the chassis and finally to the main supply to permit the surplus lubricant to be again used and thereby assure the parts with a maximum supply of lubricant at all times.

A further object of this invention is the provision of a pressure pump in the system and actuated by the movement of the clutch pedal, so that when the clutch is actuated during the operation of the vehicle, the lubricant in the system will be placed in circulation from the main supply to the moving parts and then returned to said main supply, thereby obviating waste of the surplus lubricant and the employment of check valves in the system and further permitting a certain amount of lubricant to last over a long period of time.

A still further object of this invention is the provision of a lubricating system of the above stated character which can be easily and quickly installed on a conventional type of motor vehicle chassis, which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a motor vehicle chassis with a lubricating system applied thereto and constructed in accordance with my invention.

Figure 2 is a fragmentary sectional view illustrating the main supply and the circulating pump associated with the clutch pedal of the vehicle.

Figure 3 is an enlarged sectional view illustrating the connection for conveying the lubricant from one moving part to another.

Referring in detail to the drawings, the numeral 1 indicates a conventional type of motor vehicle chassis including the frame 2 mounted on the front and rear axles 2' and 3 by the usual springs, not shown, and which springs are equipped with spring shackles 4. The front axle 2' is of the steering type having the usual steering knuckles 5 connected together by the steering link 6. The foregoing relates to a construction to which my invention is applied.

The shackle bolts or the spring shackles, king pins of the steering knuckles, and other bearing pins associated with the chassis are each provided with a lubricant passage therethrough and provided with a branch passage to permit the lubricant fed therethrough to come in contact with the bearing surface. As shown in Figure 3 the main lubricant passage 7 extends entirely through the shackle bolt from one end to the opposite end with the branch passage 8 in communication therewith and extending through one face of the shackle bolt. Each spring shackle bolt is connected to the adjacent shackle bolt by a pipe or tube 9 so that the lubricant can feed from one bolt to the other.

A main reservoir 10 having a filling neck 11 and a removable cap 12 therefor is mounted on the motor vehicle and has extending from the bottom wall a main feed pipe 13 connected to a cylinder 14 of a pump 15 mounted on the vehicle adjacent to the clutch pedal 16. A main outlet pipe 17 is connected to the cylinder 14 and is adapted to have lubricant forced therethrough which is received from the main supply reservoir 10 by way of the pipe 13 when the pump 15 is actuated.

Check valves 18 and 19 are located within the pipes 13 and 17, respectively, to prevent lubricant in said pipes from being forced in a reverse direction. These check valves are the only valves employed in the entire system. The cylinder 14 is mounted by a suitable bracket 20 and has slidably mounted therein a piston 21 provided with a stem 22 extending through a stuffing box 23 and has a pin and slot connection 24 with one end of a substantially L-shaped lever 25. A coiled spring 26 is mounted on the stem 22, with one end bearing against the stuffing box 23 and the opposite end against a collar 27 secured to the stem for the purpose of urging the piston 21 in one direction. An arm 28 extends upwardly from the cylinder 14 and carries a supporting member 29 to which the lever 25 is pivotally connected as shown at 30. The member 29 includes a pair of screw threaded sections adjustably connected by a turn buckle 31 providing means whereby the pivot 30 of the L-shaped lever 25 may be adjusted relative to the cylinder 14. The free end of the lever 25 is arranged in the path of movement of the clutch pedal 16 so that when the clutch pedal is depressed in the usual manner for operating the clutch of the vehicle, the piston 21 will be moved forwardly in the cylinder forcing the lubricant therein outwardly through the pipe 17. When the clutch is released and returns to its normal position, the spring 26 moves the piston 21 in an opposite direction drawing the lubricant into the cylinder 14 from the main reservoir 10.

The pipe 17 is connected to one end of the shackle bolt of the front spring shackle of the rear spring located at one side of the vehicle while the other end of said shackle bolt is connected to a pipe 31' leading to one of the shackle bolts of the spring shackle located between the frame and said rear spring. The pipe 31' is provided with a flexible section 32. The spring shackle last referred to is connected to the rear spring shackle at the opposite side of the frame by a pipe 33 having flexible sections 34. The last referred to spring shackle is connected to the front shackle of the rear spring at the opposite side of the frame by a pipe 35 while the shackle last referred to is connected to the rear shackle of the front spring at one side of the frame by a pipe 36. The pipe 36 is equipped with a flexible section 37. A pipe 38 is connected to the last named spring shackle and to the front spring shackle of the last referred to spring by a pipe 38 having a flexible section 39. The front shackles of the front springs are connected together by a pipe 40 while one of the front spring shackles is connected to the pipe 41 leading to the rear shackle of the respective front spring and is equipped with a flexible section 42. The last named shackle has a pipe 43 connected thereto which is in turn connected to one of the steering knuckles as shown at 44. The pipe 43 having flexible sections 45. The steering knuckle 44 has a pipe 46 connected thereto and to one of the king pins 47 which is in turn connected to the other king pin by a pipe 48 extending parallel with the front axle. The last named king pin is connected to the steering knuckle 49 by a pipe 50.

The steering knuckle 49 has a pipe 51 leading to a moving part of the engine such as the fan and which has a pipe 52 connected thereto and the latter named pipe forms a return for the lubricant to the upper end of the main reservoir 10. The main reservoir 10 adjacent its upper end is provided with a strainer 53 so that when the lubricant returns from the system and prior to entering the system a second time is thoroughly strained to remove foreign matter therefrom.

From the foregoing description taken in connection with the accompanying drawings, it will be seen that a very efficient lubricating system has been provided wherein the moving parts of the vehicle chassis may be efficiently lubricated by the lubricant passing from one moving part to another under compression from the pump 15 and as the lubricant leaves the last moving part in the system it is returned to the main reservoir for cleaning and for use another time. Further it will be noted that each time the clutch pedal is depressed in the control of the motor vehicle, the lubricant within the system will be circulated thereby assuring the moving parts with a fresh supply of lubricant at all times. The surplus lubricant instead of being wasted as customary in lubricant systems of this nature it is returned to the main supply where it is again used thus permitting a minimum amount of lubricant to be used over a long period of time and to thoroughly lubricate all of the moving parts of a chassis.

While I have shown and described the preferred embodiment of my invention, it will be understood that minor changes in construction, combination and arrangement of parts may be made without departing from the spirit and scope of my invention, as claimed.

Having thus described my invention, what I claim is:

A lubricating device comprising a cylinder mounted adjacent the clutch pedal of a motor vehicle and adapted for connection to a lubricating system and to a lubricant reservoir, a piston slidable in the cylinder to draw lubricant into and expel the lubricant from said cylinder during opposite movements thereof, a stem on said piston and extending exteriorly of the cylinder, a post on the cylinder, a support adjustable as to length on the post and arranged at right angles thereto, a bell crank lever pivoted to said support and having one end pivotally and slidably connected to the stem and having its other end arranged in the path of movement of the clutch pedal to be engaged by the latter to move the piston in the direction to expel the lubricant from the cylinder and a coil spring surrounding the stem with one end secured thereto and its opposite end bearing against the cylinder to move the piston in a direction to draw lubricant into the cylinder and to position the lever in the path of movement of the clutch pedal.

In testimony whereof I affix my signature.

CYRIL B. QUAKA.